US008056457B2

(12) United States Patent
Stahlecker

(10) Patent No.: US 8,056,457 B2
(45) Date of Patent: Nov. 15, 2011

(54) ARRANGEMENT FOR COVERING A FLAT LYING BLANK WITH A COVER

(75) Inventor: Werner Stahlecker, Goeppingen (DE)

(73) Assignee: Michael Hoerauf Maschinenfabrik GmbH & Co. KG, Donzdorf (DE)

( * ) Notice: Subject to any disclaimer, the term of this patent is extended or adjusted under 35 U.S.C. 154(b) by 212 days.

(21) Appl. No.: 11/788,305

(22) Filed: Apr. 19, 2007

(65) Prior Publication Data

US 2008/0105097 A1 May 8, 2008

(30) Foreign Application Priority Data

Nov. 2, 2006 (DE) .................... 20 2006 017 275 U

(51) Int. Cl.
*B23D 19/04* (2006.01)
*B42C 7/00* (2006.01)
*B29C 65/00* (2006.01)
*B32B 37/00* (2006.01)

(52) U.S. Cl. ................. 83/495; 412/3; 412/17; 156/256

(58) Field of Classification Search ............ 83/495–507; 156/256, 264, 265, 227, 517, 475, 908; 412/3, 412/4, 9, 17, 19
See application file for complete search history.

(56) References Cited

U.S. PATENT DOCUMENTS 2,667,909 A * 2/1954 Stobb ............................ 156/444
3,314,089 A * 4/1967 Margolis et al. .................. 412/3
3,884,742 A * 5/1975 Roberts ......................... 156/268
4,377,430 A * 3/1983 Bexley et al. ................. 156/184
4,615,541 A * 10/1986 Kwauka .......................... 281/29
4,889,461 A * 12/1989 Kampen et al. ................. 412/19
4,917,364 A * 4/1990 Iida et al. ........................ 270/37
5,098,074 A * 3/1992 Mandel et al. ............. 270/58.13
5,377,965 A * 1/1995 Mandel et al. .................. 270/37
5,465,213 A * 11/1995 Ross ............................ 700/117
6,056,493 A * 5/2000 Hartwig et al. ................... 412/8
6,142,469 A * 11/2000 Nanba et al. .................. 271/288
6,190,298 B1 2/2001 Blumberg
6,532,856 B2 * 3/2003 Kato et al. ...................... 83/934
6,726,423 B2 * 4/2004 Hocking ............................ 412/1
6,732,777 B2 * 5/2004 Ertel et al. .................... 156/353
6,910,686 B2 * 6/2005 Awano ............................ 270/37
(Continued)

FOREIGN PATENT DOCUMENTS

DE 4238560 A1 5/1994
EP 0631957 A2 1/1995
WO WO 94/05508 A1 3/1994

OTHER PUBLICATIONS

European Patent Office Search Report dated Feb. 17, 2010 (8 pages).
China Patent Office First Office Action dated Dec. 11, 2009 (11 pages).

*Primary Examiner* — Ghassem Alie
*Assistant Examiner* — Bharat C Patel
(74) *Attorney, Agent, or Firm* — Flynn, Thiel, Boutell & Tanis, P.C.

(57) ABSTRACT

An arrangement for covering a flat lying blank, preferably made of paperboard, with a cover, as is in particular applicable in the manufacture of book cases. The arrangement comprises fixing means for simple coupling of a circular cutting device. This circular cutting device comprises transport means for direct feeding of the cut blank to the arrangement.

5 Claims, 2 Drawing Sheets

U.S. PATENT DOCUMENTS 7,360,958 B2 * 4/2008 Awano .......................... 400/621
7,490,450 B2 * 2/2009 Stahlecker ...................... 53/206
7,780,160 B2 * 8/2010 Sato .......................... 270/58.12
2002/0061239 A1 * 5/2002 Bohn et al. ...................... 412/19
2002/0112581 A1 * 8/2002 Lin et al. ......................... 83/165
2004/0170462 A1 * 9/2004 Awano .......................... 400/621

* cited by examiner

ARRANGEMENT FOR COVERING A FLAT LYING BLANK WITH A COVER

FIELD OF THE INVENTION

The present invention relates to an arrangement for covering a blank, which lies flat and is preferably made of paperboard, with a cover, as is in particular applicable in the manufacture of book cases. The invention relates further to a circular cutting device for cutting a flat lying blank for an arrangement of this type.

BACKGROUND OF THE INVENTION

An arrangement of this type is, for example, prior art in book case machines of the firm Hoerauf. In the arrangement, a single-piece or multi-piece blank is provided in cycles in a number of working stations with a cover. The finished blanks, provided with the covers, can be used as book cases, folders or game boards. In the case of the manufacture of a book case, for example, in which a multi-piece blank is required, it can be provided that the ready cut blanks are fed in stacked form to the arrangement. It is also known that book case machines are applied which comprise a circular cutting device. The blanks are cut into two or three parts directly in the book case machine by the circular cutter, so that, according to whatever is required, a part for the front and the back of the book as well as for the book spine is cut. In the case of the known arrangement with circular cutter, the device is always mounted in a fixed way. When a one-piece blank is to be provided with a cover in a book case machine comprising a circular cutter, the cutting blades of the circular cutter could be brought into a position so that the blank would not be cut in the circular cutting device, but would, however, still have to travel through same. The transport means available in the arrangement for the blank, which transport means comprise sliders and/or grippers as well as guiding rails, work in cycles and transport the blank from one working station to the next. In the case of a change in format, the working stations and the transport means of the book case machine must be adapted to this new format. If blanks which do not require the circular cutting device are frequently processed in the arrangement, the transport and guiding means in the circular cutting device must nevertheless be adapted in the case of a new format. This involves a high level of adaptation of the respective devices. In addition it is frequently the case today that the number of items in a production order becomes less and less, so that the arrangement must be adapted very often to changing formats. An arrangement for covering a flat lying blank with a cover and comprising a permanently installed circular cutter is, in such cases, relatively inflexible in that all applications are possible but involve a high level of adaptation of the devices.

SUMMARY OF THE INVENTION

It is an object of the present invention to create an arrangement which has a higher level of flexibility for ever-changing application requirements.

This object has been achieved in accordance with the present invention in that the arrangement comprises fixing means for simple coupling of a circular cutting device, and in that the coupling circular cutter comprises transport means for direct feeding of the cut blank to the arrangement. The circular cutting device comprises fixing means for simple coupling to the arrangement, which fixing means are accordingly adapted to the fixing means of the arrangement.

The coupling means can hereby be optionally designed. Advantageous are fixing means which comprise bolts, tapered pins or stoppers for the purposes of reproduceable positioning. They also advantageously comprise a clamping device.

A circular cutting device for coupling and un-coupling to an arrangement for covering a flat-lying blank with a cover has the advantage in that the arrangement has many application possibilites and is thus very flexible. The complexity of the conversion of such an arrangement in the case of a format change is significantly reduced. If the circular cutter is not required, then it can simply be de-coupled from the book case machine and removed, whereby during operation without a circular cutting device, more direct and improved accessibility is achieved.

If the arrangement is converted from an operating process without a circular cutting device back to operation with a circular cutting device, the circular cutting device can be simply coupled to the arrangement. If, in the case of such a conversion, a format change is also necessary, the coupled circular cutting device offers the advantage in that it can be adapted to the new format while not yet coupled to the arrangement, and while the book case machine is still producing. Production standstill in the case of a format change of the book case machine is reduced to the conversion time required for the adjustment of the working stations in the book case machine. As the conversion time required for the setting up of the circular cutting device takes up a high percentage of the overall conversion time for the rest of the machine, the production standstill of the book case machine is considerably reduced.

It is essential that the circular cutting device, which can be coupled, comprises transport means which permit a direct feeding of the cut blank to the arrangement.

The concept "direct feeding" means in this case that the blank, cut in the circular cutting device, is transferred to the book case machine preferably without any significant change of direction and synchronized and in tact with the cycles of the book case machine. "Direct feeding" also means that the blanks are transferred individually in cycles to the arrangement one after the other and are individually processed by same. The blank is always fed during the transfer by transport means without intermediary storing of the cut blanks in a stack of same. The transport means, which permit a direct feeding of the cut blank to the arrangement, ensures also that blanks cut in narrow strips can be processed fault-free in rapidly operating machines with short cycles.

In addition to the circular cutters integrated into the machine in prior art, retrofittable circular cutting devices for book case machines are also known, which do not comprise exactly this feature of "direct feeding of the cut blank". In the case of these known retrofittable circular cutting devices, the feeding of the blank takes place "indirectly", namely in that the cut blanks are deposited from above on top of the stack of blanks located at the entrance of the book case machine. For this process an extreme change in direction is necessary for the blanks. Also the guiding of the blanks during their placing on the stack cannot be continuously ensured. In particular in the case of a blank cut into narrow strips, as is required for a narrow book spine for example, the narrow strip frequently tips around its longitudinal axis and is not duly placed properly on the stack. In such a case the arrangement must be stopped and the fault manually corrected.

It is advantageous when the arrangement comprises a control system with which the circular cutting device can be connected. The circular cutting device advantageously comprises its own drive, which is connectable, preferably via a plug-in connection, with the control system of the arrangement in the case of coupling. The control system of the arrangement registers whether a circular cutting device is coupled and thus permits the operation of the arrangement with or without a circular cutting device.

In an advantageous embodiment of the present invention it is provided that the circular cutting device comprises at least two wheels, by means of which the circular cutting device can be wheeled on the ground when being coupled and uncoupled. The circular cutting device can thus be moved around very easily when it is being coupled or uncoupled without the aid of any particular auxiliary means.

BRIEF DESCRIPTION OF THE DRAWINGS

These and further objects, features and advantages of the present invention will become more readily apparent from the following detailed description thereof when taken in conjunction with the accompanying drawings wherein.

DETAILED DESCRIPTION OF THE DRAWINGS

Figure 1:
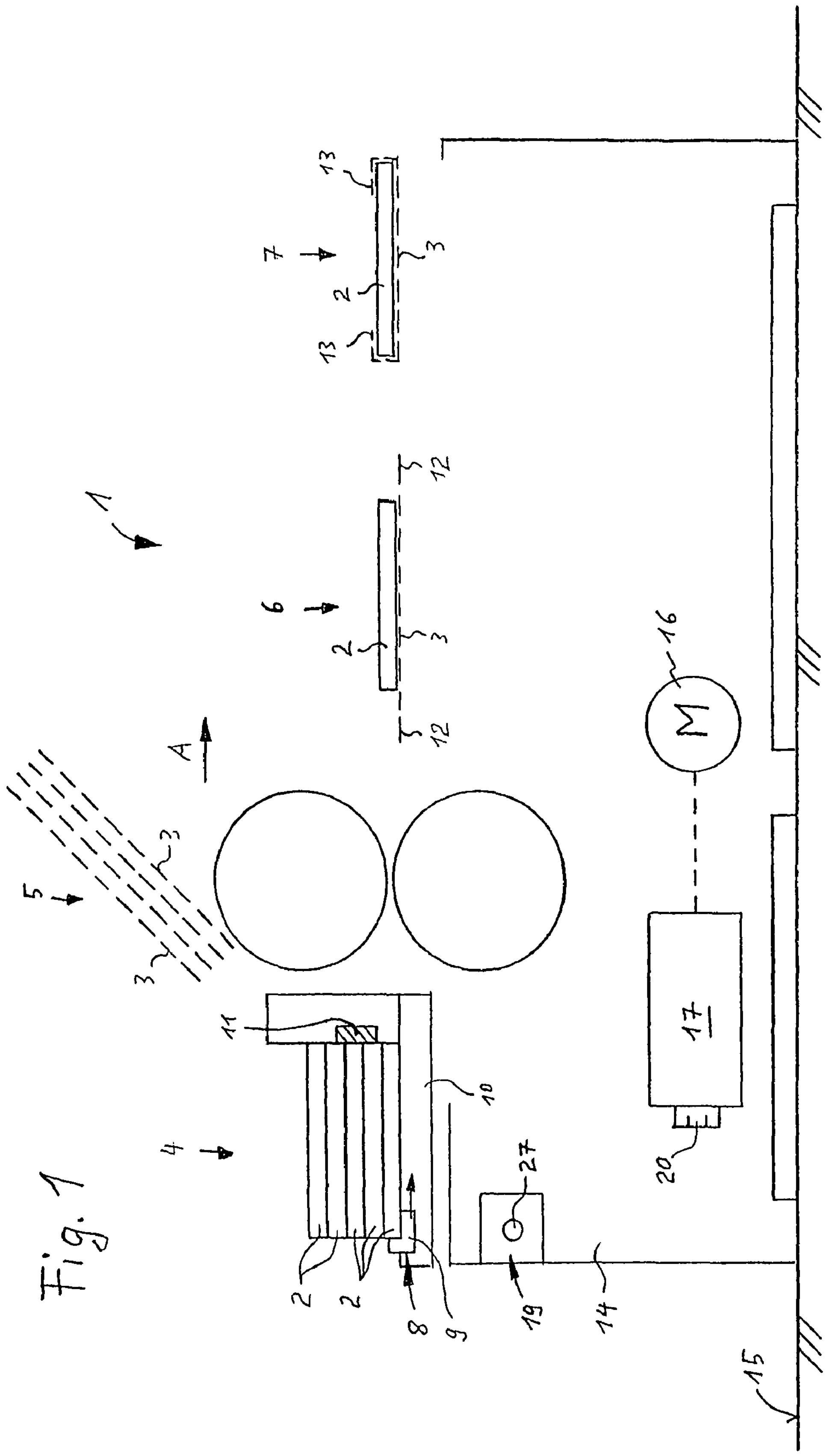
FIG. 1 is a very schematic and not-to-scale side view of a book case machine without a circular cutting device according to the present invention.

In FIG. 1 an arrangement 1 for covering a flat-lying blank 2 with a cover 3 is shown. The arrangement 1 in the form of a book case machine serves to produce book cases, folders, ring binders and game boards. The blank 2 is hereby usually made of paper board and can be one-piece or multi-piece in design.

The arrangement 1 comprises a number of processing stations 4 to 7 through which the blank 2 will be transported in cycles in transport direction A. Depending on the requirements, the number of processing stations may necessarily vary. The actual processing steps are known and are therefore described only schematically below.

A stack of blanks 2 is placed in the feed station 4. The blanks 2 are isolated by the transport means 8 and fed to a joining station 5. The transport means 8 comprise hereby a number of sliders 9 and guiding rails 10. When the slider 9 is moved in transport direction A, the blank 2 at the bottom of the stack of blanks is taken along in transport direction A. All the blanks 2 stacked thereabove are held back by a stopper rail 11. In the joining station 5, a cover 3, denoted by a dot-dash line, is removed from a stack, covered with glue and joined together with the blank 2. In a subsequent processing step, the blank 2, provided with the cover 3, is transported further to a folding station 6, in which the projecting edges 12 of the cover 3 are folded in, that is, are folded around the edge of the blank 2. A number of processing stations could alternatively be applied for the process of folding the edges 12. In the last processing station 7 the folded-in edges 13 of the cover 3 can be pressed again by means of a press roller pair (not shown). The transport of the blank 2, provided with the cover 3, from the joining station 5 through the processing stations 6 and 7 is carried out by transport means (not shown), which could, for example, comprise a gripper fixed to a belt.

The processing stations 4 to 7 of the arrangement 1 are arranged in a machine frame 14 which is positioned on the floor 15. The drive 16 for the arrangement 1 is housed in the machine frame 14, which drive 16 comprises at least one electric motor for generating the necessary movement of the working means in the processing stations 4 to 7, and the transport means. The drive 16 is controlled by a control system 17.

The arrangement 1 is prepared in such a way that it can also be operated with a circular cutting device 18 if required. The circular cutting device 18 is described below in more detail. In order to couple the circular cutting device 18, fixing means 19 are provided on the arrangement 1. The fixing means 19 are denoted in FIG. 1 in the area of the feeding station 4 in the machine frame 14. The fixing means 19 are easily detachable and permit a reproducible positioning of the circular cutting device 18 in coupling. The fixing means 19 comprise advantageously for this purpose at least one bolt or tapered pin, and a clamping device. A plug-in connection 20 is provided on the control system 17 of the arrangement, by means of which the circular cutting device 18 can be connected with the control system 17 in coupling to the arrangement 1.

Figure 2:
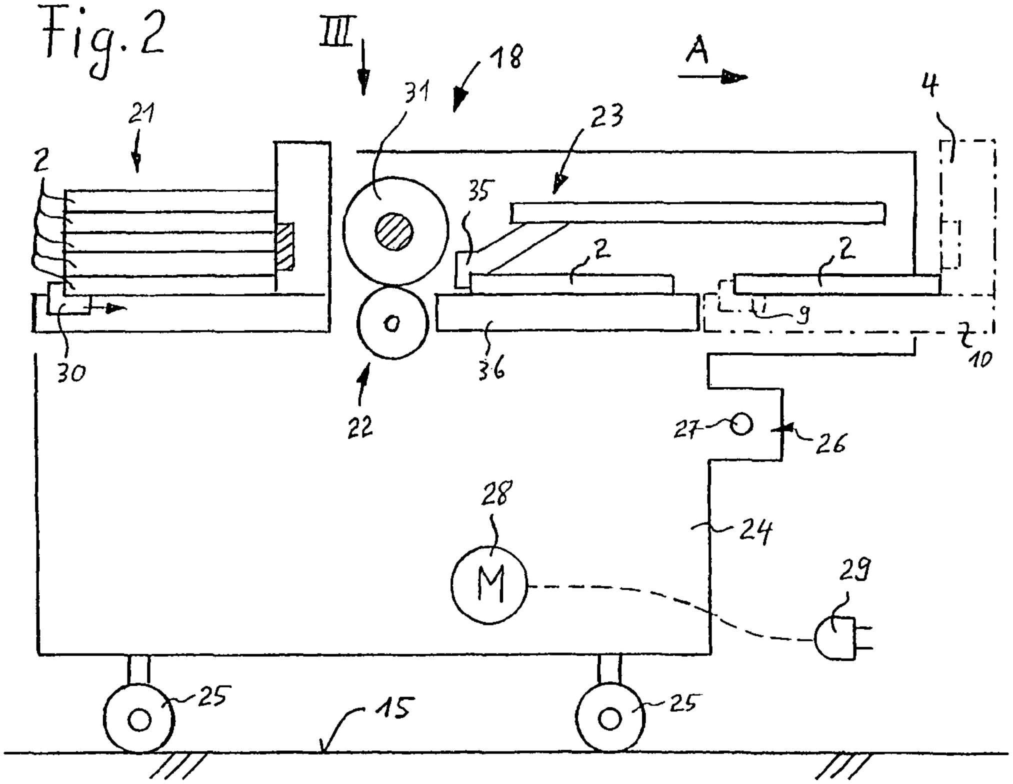
FIG. 2 is a side view of a schematically shown circular cutting device which can be coupled to the book case machine according to FIG. 1.
Figure 3:
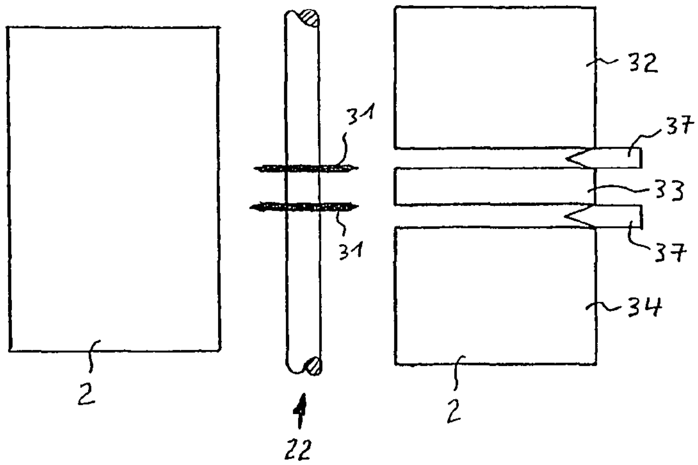
FIG. 3 is a schematic top view in the direction of the arrow III of the circular cutting device as shown in FIG. 2.

In FIGS. 2 and 3, the circular cutting device 18 is schematically shown. The circular cutting device 18 consists essentially of a magazine 21, a circular blade station 22, transport means 23 and a frame 24. The circular cutting device 18 is moveable on the floor 15 by means of four wheels 25 applied to the frame 24. The circular cutting device 18 is pushed via the wheels 25 to the arrangement 1 and coupled in the area of the feeding station 4. Fixing means 26 are applied to the frame 24 of the circular cutting device 18, which fixing means 26 are adapted to the fixing means 19 of the arrangement 1. The fixing means 19 and 26, for example, can comprise bore holes 27, so that the frame 24 can be attached to the machine frame 14 via bolts (not shown) which are placed in the bore holes 27.

The circular cutting device 18 comprises advantageously its own drive 28, which is connected to the control system 17 of the arrangement 1 in the case of coupling of the circular cutting device 18. A plug 29 is applied to the drive, which can be plugged into the plug-in connection 20 in the control system 17. The circular cutting device 18 coupled with the arrangement 1 is controlled by the control system 17 of arrangement, so that the drive 28 executes the movements of the circular cutting device 18 synchronous with the arrangement 1. The circular cutting device 18 does not therefore require its own control system.

The circular cutting device 18 coupled with the arrangement 1 serves to cut a one-piece blank 2 in several pieces, preferably two or three. Alternatively, a two-piece blank 2 can be cut (not shown) into four pieces. In the magazine 21 a stack of one-piece blanks 2 is presented to the circular cutting device 18. The bottom most blank 2 in the magazine 21 is separated in the same way as in the above described feeding station 4 and is pushed into the circular blade station 22 by means of a slider 30. In the circular blade station 22, two circular blades 31 are arranged, which cut the blank 2 into three pieces 32, 33 and 34. The piece 32 of the blank 2 forms subsequently, for example, the front side of a book, the piece 33 the book spine and the piece 34 the back side. Subsequent to the circular blade station 22 the cut blanks are taken over by transport means 23 and then fed directly to the arrangement 1. The transport means 23 comprise sliders 35 and guiding rails 36, which transfer the cut blanks 2, in tact with the work cycle of the arrangement 1 and without a change in direction, to the feed station 4. The position taken up by the feed station 4 of the arrangement 1 in relation to the coupled circular cutting device 18 is denoted in FIG. 2 by a dot-dash line. When the circular cutting device 18 is coupled, there is no stack of blanks 2 present in the feed station 4 of the arrangement 1. Instead, in each work cycle one blank 2 is transported by the transport means 23 out of the circular cutting device 18 into the feed station 4, which blank 2 is transported further in the subsequent work cycle by the transport means 8 from the feed station 4 to the joining station 5. The feed station 4 is advantageously so designed that when the circular cutting device 18 is coupled or un-coupled, no conversion measures are required for the feed station 4.

The pieces 32, 33 and 34 are transferred without intermediate storage directly in a straight line from the circular cutter station 22 to the feed station 4. The pieces 32, 33 and 34 of the blank 2 are guided constantly by the transport means. The guiding rails 36 reach at least to the guiding rails 10 and even overlap these, so that during the transfer the blank 2 is at no time left unguided. Thus even cut blanks having for example a very narrow book spine 33 can be processed reliably and at a high work cycle rate.

In order that the parts 32, 33 and 34 of the cut blank 2 are at the necessary distance from one another in the feed station 4, guiding rails 37 can be arranged in the area between the circular blade station 22 and the feed station 4, said guiding rails 37 tapering in a wedge shape at their front side and pushing the pieces 32, 33 and 34 of the blank apart transversely to the transport direction A.

In an embodiment not shown, it can also be provided that a one-piece blank 2 is only cut once in the circular blade station 22. A two-piece blank 2 made of the pieces 32 and 34 can, for example, form a game board. Alternatively it can be provided that instead of the part 33 for the book spine, a flexible spine from a roll is fed into the feed station 4. In this case, after cutting in the circular blade station 22, both the pieces 32 and 34 for the front and back side of the book must be moved apart transversely to the transport direction A to a significantly larger degree, so that there is sufficient space for the flexible spine. The guiding rails 37 can be accordingly altered in this case.

The circular cutting device 18 according to the present invention brings a high degree of flexibility to the arrangement 1 while simultaneously retaining the advantages of a book case machine having a permanently installed circular cutter. By means of the transport means 23 for direct feeding of the cut blank 2 to the arrangement 1, the high degree of reliability in processing difficult blanks 2 is retained. The fixing means 19 and 26, which permit a simple coupling and uncoupling of the circular cutting device 18, have the effect of significantly reducing the conversion time of the machine when it has to be adapted from one format to another. If, for example, the circular cutting device 18 is not required for obtaining a one-piece blank 2, the circular cutting device 18 can be uncoupled and moved away from the arrangement 1 in a few easy movements. Only the transport and working means in the working stations 4, 5, 6 and 7 of the arrangement 1 need then to be adapted to the new format. An additional adjustment of the circular cutter 31 and the transport means 23, which would be necessary in the case of the known book case machine having a permanently installed circular cutter, is in this case omitted.

If the arrangement 1 subsequently also processes a multi-piece blank 2, in which process the circular cutting device 18 is again required, the machine standstill time necessary for conversion is cut by a significant amount. The adjustments to the circular cutting device 18, in particular to the circular blades 31 and the transport means 23 with the sliders 35 and the guiding rails 36, can be carried out when the circular cutting device 18 is not yet coupled to the arrangement 1, and the arrangement 1 is still operating on the production of one-piece blanks. During conversion, the standstill time of the arrangement 1 is in turn reduced to the time required for the adjustment of the working stations 4 to 7. The circular cutting device 18 is already adjusted and needs only to be coupled to the arrangement 1.

The invention claimed is:

1. A blank cutting and covering system comprising:

a mobile blade unit having a frame, a rotary blade supported by the frame, and a blade unit fixing coupler attached to the mobile blade unit frame; and a covering arrangement including a cover disposed to cover a blank and a covering arrangement fixing coupler disposed to mate with and attach to the blade unit fixing coupler to thereby temporarily attach the mobile blade unit to the covering arrangement, and disposed to detach from the blade unit fixing coupler to allow the mobile blade unit to wholly and completely detach from the covering arrangement, the covering arrangement being a stand alone arrangement configured to operate with and without the mobile blade unit attached thereto, the mobile blade unit further comprising a transporter adjacent the blade and disposed to feed a cut blank from the mobile blade unit to the covering arrangement, the mobile blade unit being portable with respect to the covering arrangement and movable toward and away from the covering arrangement when the mobile blade unit is not coupled to the covering arrangement.

2. A system according to claim 1, wherein the transporter comprises at least one guiding rail.

3. A system according to claim 1, further comprising a drive which is connectable to a control system of the covering arrangement when the mobile blade unit is attached to the covering arrangement.

4. A system according to claim 1, wherein at least two wheels are provided, on which the mobile blade unit can be transported during coupling.

5. A blank processing system comprising:

a blank processing unit having a frame, a plurality of processing stations supported by the frame, a first coupling attached to the frame, and a conveyor supported by the frame and disposed to convey a flat blank through the processing stations in a processing direction, each processing station being capable of automatically processing blanks; and a cutting unit comprising a cutting unit frame, a rotary cutter supported by the cutting unit frame, a second coupling attached to the cutting unit frame and configured to temporarily attach to and detach from the first coupling thereby allowing the cutting unit to be in one of an attached state or an unattached state relative to the blank processing unit, and a transporter comprising at least one slider and capable of transporting cut blanks in the processing direction from the cutting unit to one of the processing stations of the blank processing unit when the cutting unit is in the attached state, the cutting unit being movable toward and away from the blank processing unit when the cutting unit is in the unattached state;

wherein the blank processing unit is a stand alone arrangement configured to operate with and without the cutting unit attached thereto.

* * * * *